US008433934B1

(12) United States Patent
On

(10) Patent No.: US 8,433,934 B1
(45) Date of Patent: Apr. 30, 2013

(54) SAVING BATTERY ON WIRELESS CONNECTIONS ON MOBILE DEVICES USING INTERNAL MOTION DETECTION

(75) Inventor: Robert On, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/535,706

(22) Filed: Jun. 28, 2012

(51) Int. Cl.
*G06F 1/26* (2006.01)
*G08C 17/00* (2006.01)

(52) U.S. Cl.
USPC ........... 713/300; 713/310; 713/320; 713/321; 713/322; 713/324; 713/330; 713/340; 370/311

(58) Field of Classification Search .................. 713/300, 713/310, 320–324, 330, 340; 370/311
See application file for complete search history.

(56) References Cited

U.S. PATENT DOCUMENTS

| 6,584,331 | B2 * | 6/2003 | Ranta | 455/574 |
| 6,961,594 | B2 * | 11/2005 | Rankin | 455/574 |
| 7,460,869 | B2 * | 12/2008 | Pekonen et al. | 455/436 |
| 8,095,189 | B2 * | 1/2012 | Trajkovic et al. | 455/574 |
| 2006/0068832 | A1 | 3/2006 | Islam et al. | |
| 2010/0184420 | A1 * | 7/2010 | Reinhold et al. | 455/418 |

* cited by examiner

*Primary Examiner* — M Elamin
(74) *Attorney, Agent, or Firm* — MH2 Technology Law Group, LLP

(57) ABSTRACT

Implementations relate to a computer-implemented method, device, and computer readable storage medium for optimizing battery life in a mobile computing device. The method includes determining that a wireless signal associated with a wireless network connection utilized by the mobile computing device is at or below a reception strength threshold; disabling the wireless network connection in response to the wireless signal being at or below the reception strength threshold; acquiring, from one or more motion sensors of the mobile computing device, an amount of motion of the mobile computing device during a predetermined time period; determining whether the amount of motion of the mobile device exceeds a predetermined motion threshold; and enabling the wireless network connection in response to the amount of motion exceeding the predetermined motion threshold.

20 Claims, 4 Drawing Sheets

SAVING BATTERY ON WIRELESS CONNECTIONS ON MOBILE DEVICES USING INTERNAL MOTION DETECTION

TECHNICAL FIELD

The present disclosure relates generally to battery-powered mobile devices, and specifically, to battery optimization for the mobile devices.

BACKGROUND

The usefulness of mobile wireless communication devices, such as smart phones and cellular phones, are dependent on the battery life of the mobile devices. One of the main consumers of power for mobile devices relates to the wireless network transceiver and controller, and the ability of the wireless network transceiver and controller to establish and maintain the wireless network connection. In situations where the mobile device is located in a weak wireless network connection environment, the mobile device may continuously try to reacquire a new or different wireless network connection. This activity produces an increased burden on the battery of the mobile device due to the wireless network transceiver and controller continuously communicating with the wireless network, which can reduce the battery life of the mobile device. Conventionally, the user of the mobile device would need to determine that the mobile device is in a poor signal strength location and actively change one or more settings on the mobile device to turn off or disable the wireless connections on the mobile device. What is needed is an improved mechanism to reduce the burden on the battery of the mobile device when the mobile device is in a wireless network connection environment that has a reduced or less than optimal strength of the wireless signal.

BRIEF SUMMARY

In implementations, a method for optimizing battery life in a mobile computing device is disclosed. The method comprises determining that a wireless signal associated with a wireless network connection utilized by the mobile computing device is at or below a reception strength threshold; in response to determining that a wireless signal associated with a wireless network connection utilized by the mobile computing device is at or below a reception strength threshold, disabling the wireless network connection in response to the wireless signal being at or below the reception strength threshold; while the wireless network connection is disabled: determining, from one or more motion sensors of the mobile computing device, an amount of motion of the mobile computing device during a predetermined time period; determining that the amount of motion of the mobile device exceeds a predetermined motion threshold; and in response to determining that the amount of motion of the mobile device exceeds a predetermined motion threshold, enabling the previously-disabled wireless network connection.

In implementations, the method further comprises determining a new time period in response to the amount of motion not exceeding the predetermined motion threshold; acquiring, from the motion sensor of the mobile computing device, a new amount of motion of the mobile computing device during a new time period; determining whether the new amount of motion of the mobile device exceeds a predetermined motion threshold; and enabling the wireless network connection in response to the new amount of motion exceeding the predetermined motion threshold.

In implementations, the new time period can be determined based on an exponential back-off algorithm.

In implementations, the motion sensor can comprise a gyroscope, an accelerometer, or both.

In implementations, the method can comprise wherein the determining, by the gyroscope, whether the amount of motion of the mobile device exceeds a predetermined motion threshold comprises: measuring a rotational velocity of the mobile device along three primary axes during the predetermined time period; computing a vector sum of the rotational velocity; and determining displacement based on the vector sum of the rotational velocity and the predetermined time period.

In implementations, the method can comprise wherein determining, by the accelerometer, whether the amount of motion of the mobile device exceeds a predetermined motion threshold comprises: measuring an applied force experienced by the mobile device while in motion along three primary axes during the predetermined time period; computing an acceleration value as a three-dimensional vector acceleration having components in three principle axes; and determining displacement based on the three-dimensional vector acceleration and the predetermined time period.

In implementations, the method can further comprise determining, prior to disabling the wireless network connection, a battery level of the mobile computing device; and disabling the wireless network connection if the battery level is at or below a minimum battery level.

In implementations, a device is disclosed that comprises one or more processors; and a computer readable medium comprising instructions that cause the one or more processors to perform a method comprising: determining that a wireless signal associated with a wireless network connection utilized by the mobile computing device is at or below a reception strength threshold; in response to determining that a wireless signal associated with a wireless network connection utilized by the mobile computing device is at or below a reception strength threshold, disabling the wireless network connection in response to the wireless signal being at or below the reception strength threshold; while the wireless network connection is disabled: determining, from one or more motion sensors of the mobile computing device, an amount of motion of the mobile computing device during a predetermined time period; determining that the amount of motion of the mobile device exceeds a predetermined motion threshold; and in response to determining that the amount of motion of the mobile device exceeds a predetermined motion threshold, enabling the previously-disabled wireless network connection.

In implementations, a computer readable storage medium is disclosed that comprises instructions that cause one or more processors to perform a method comprising: determining that a wireless signal associated with a wireless network connection utilized by the mobile computing device is at or below a reception strength threshold; in response to determining that a wireless signal associated with a wireless network connection utilized by the mobile computing device is at or below a reception strength threshold, disabling the wireless network connection in response to the wireless signal being at or below the reception strength threshold; while the wireless network connection is disabled: determining, from one or more motion sensors of the mobile computing device, an amount of motion of the mobile computing device during a predetermined time period; determining that the amount of motion of the mobile device exceeds a predetermined motion threshold; and in response to determining that the amount of motion of the mobile device exceeds a predetermined motion threshold, enabling the previously-disabled wireless network connection.

DESCRIPTION OF DRAWINGS

The accompanying drawings, which are incorporated in and constitute a part of this specification, illustrate implementations of the present teachings and together with the description, serve to explain the principles of the present teachings.

DETAILED DESCRIPTION

In general, implementations of the present disclosure relate to methods, devices, and computer readable medium for optimizing battery life in a battery-operated mobile computing devices or mobile devices. In implementations, the mobile device can be operable to determine that a wireless signal associated with a wireless network connection is at or below a reception strength threshold. The mobile device can then disable the wireless network connection in response to the determination that the wireless signal being at or below the reception strength threshold. Since the wireless network connection is unlikely to improve while the mobile device is in the area of poor or intermittent network connectivity, the mobile device can be operable to postpone any further attempts to acquire network connectivity until the mobile device has moved locations. The mobile device can be operable to acquire, from one or more motion sensors of the mobile computing device, an amount of motion experienced by the mobile device during a predetermined time period. If the amount of motion of the mobile device is determined to exceed a predetermined motion threshold, then mobile device can be operable to try to acquire the wireless network connection or a new or different wireless network connection in response to the amount of motion exceeding the predetermined motion threshold. The predetermined motion threshold can include, for example, an amount of motion, movement, and/or distance that approximates a likelihood of increased signal strength and can be determined with some experimentation by the user. In some implementations, the motion threshold need not be predetermined, but could be learned dynamically. By way of an example, a few minutes of constant or nearly constant movement or gyroscopic activity of the mobile device could be used as an initial approximation for the motion threshold and which can later be refined by further experimentation.

Reference will now be made in detail to example implementations of the present teachings, which are illustrated in the accompanying drawings. Where possible the same reference numbers will be used throughout the drawings to refer to the same or like parts.

Figure 1:
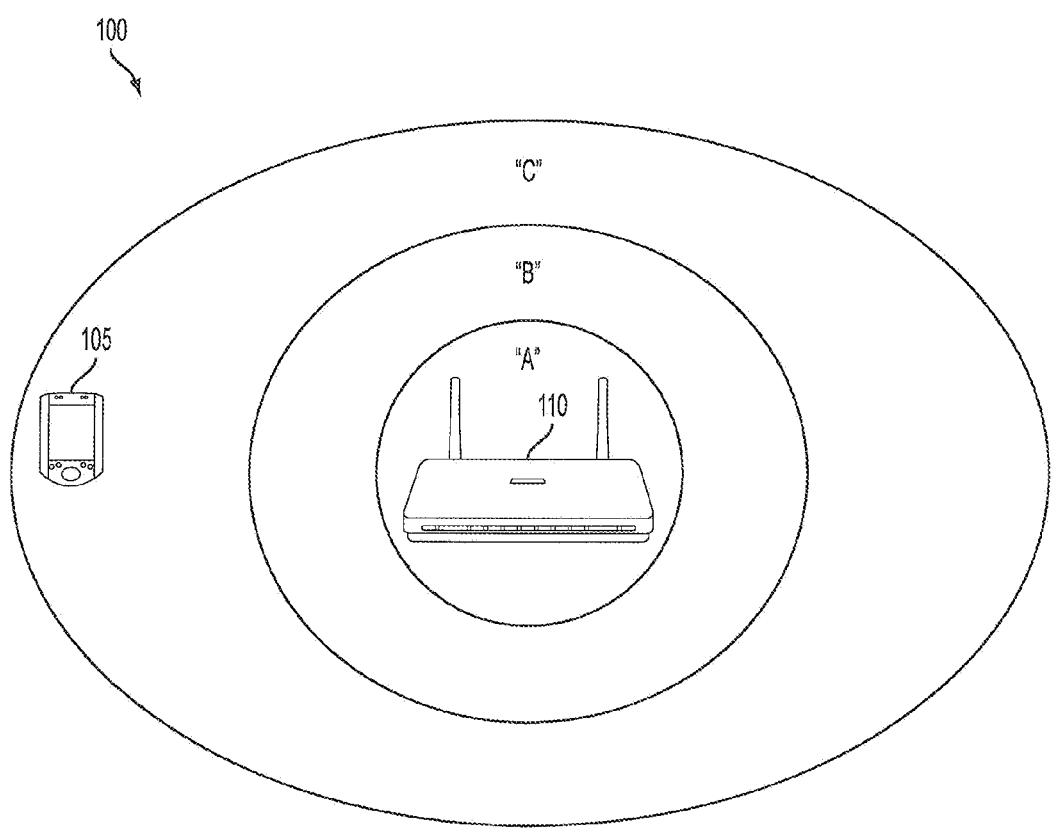
FIG. 1 shows an example configuration and arrangement of a mobile device in a wireless network environment in accordance with implementations of the present disclosure.

FIG. 1 shows an example network scenario in accordance with implementations of the present disclosure. It should be readily apparent to one of ordinary skill in the art that the example network scenario depicted in FIG. 1 represents a generalized schematic illustration and that other components/ devices can be added, removed, or modified. For example, one or more servers, routers, network nodes, and additional mobile devices can be in the example network scenario.

Figure 4:
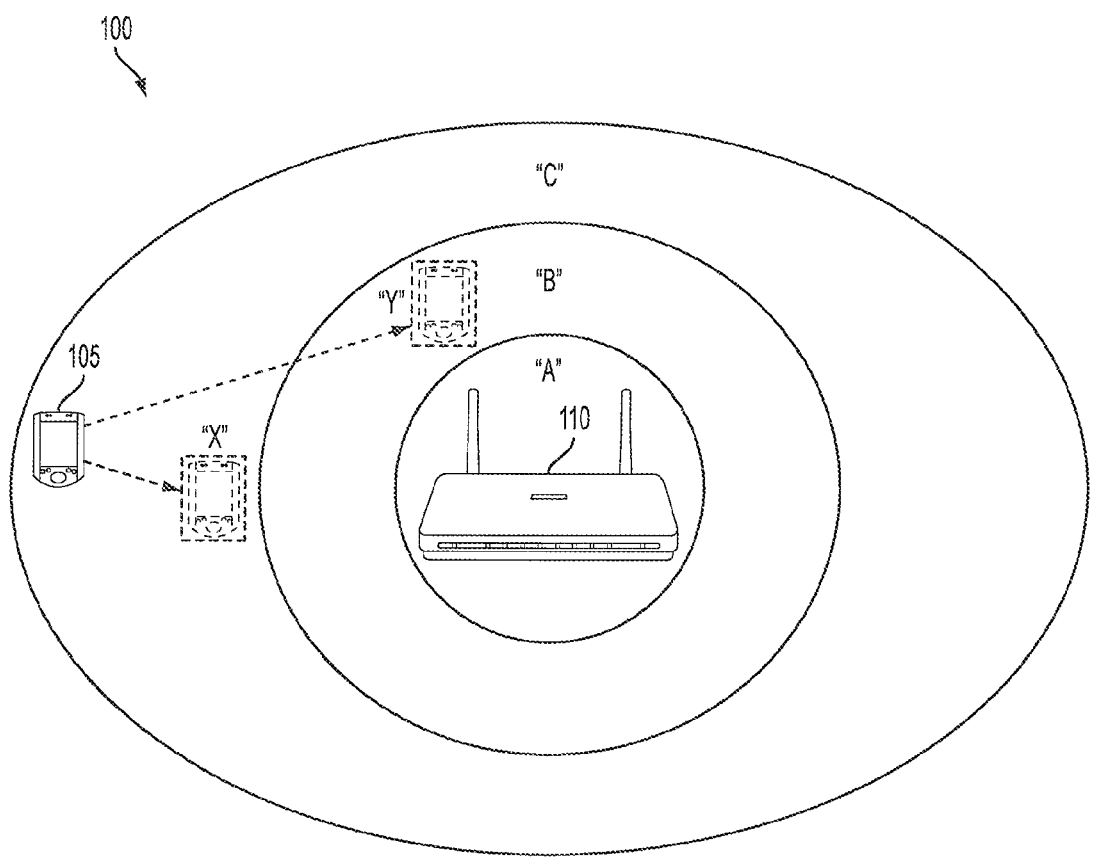
FIG. 4 shows another example configuration and arrangement of a mobile device in a wireless network environment in accordance with implementations of the present disclosure.

Referring to FIG. 1, example network scenario, shown generally at 100, can include mobile device 105 and access point 110. For simplicity, only one mobile device 105 and access point 110 are shown; however, more than one mobile device, access point, or both can be included. FIG. 4, which is discussed further below, is similar to FIG. 1 and shows movement of mobile device 105 within the network scenario to two example end location points. Each mobile device, access point, or both can include hardware, software, and/or firmware that is operable to connect using one or more wireless communication protocols to one or more wireless communication networks. The signal strength of the network connectivity for access point 110 tends to decrease with distance from the transceiver of access point 110. For example, region "A" of access point 110 can have a higher signal strength than region "B," which can have a higher signal strength than region "C." When mobile device 105 moves from regions of higher signal strength to lower signal strength, for example, from region "A" to "B" to "C," the likelihood of poor or intermittent connectivity tends to increase. As a result of the decrease in signal strength or intermittent connectivity experienced by mobile device 105 as the distance between mobile device 105 and access point 110 increase, usage of battery resources tend to increase as mobile device 105 tries to reconnect, for example, by boosting the power of the transmitted signal.

Access point 110 is one example of a network node that can be used to provide wireless network resources and connectivity to mobile device 105. Access point 110 can be used with other network hardware e.g. cellular connection/cellular tower, Bluetooth, etc. In implementations, more than one access point 110 can also be included in the communication network, where each access point 110 can be operable to communicate using the same or different wireless communication protocols.

Figure 2:
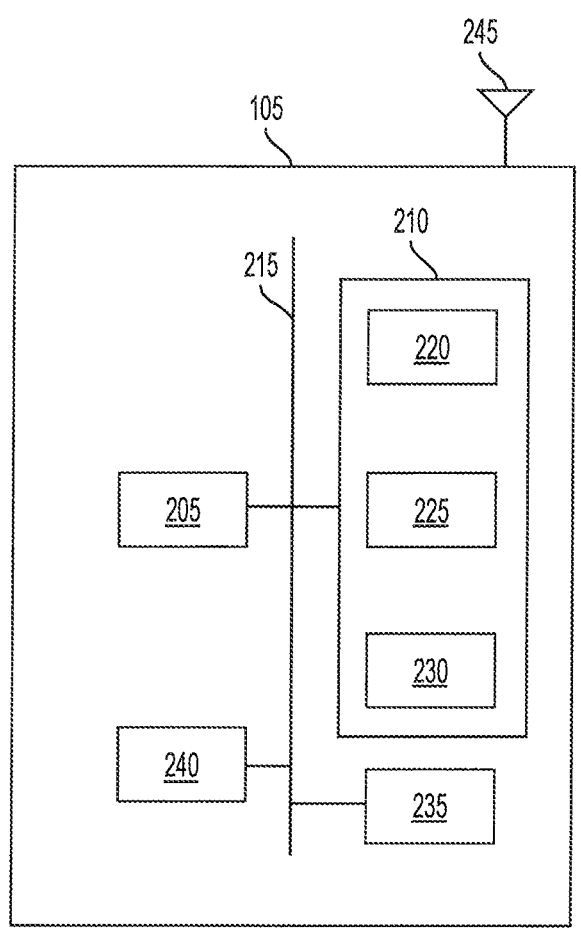
FIG. 2 shows aspects of the mobile device in greater detail.

FIG. 2 shows mobile device 105 of FIG. 1 in more detail in accordance with implementations of the present disclosure. It should be readily apparent to one of ordinary skill in the art that the mobile device 105 depicted in FIG. 2 represents a generalized schematic illustration and that other components/ devices can be added, removed, or modified.

In implementations, mobile device 105 can include one or more processors 205 and a system memory 210. Bus 215 can be used for communicating between processor 205 and system memory 210. Depending on the desired configuration, processor 205 may be of any type including but not limited to a microprocessor ($\mu P$), a microcontroller ($\mu C$), a digital signal processor (DSP), or any combination thereof.

Depending on the desired configuration, device memory 210 may be of any type including, but not limited to, volatile memory (such as RAM), non-volatile memory (such as ROM, flash memory, etc.) or any combination thereof. Device memory 210 can include an operating system 220, one or more applications 225, and program data 230. Applications 225 can include algorithms, or combinations of algorithms, for example, battery optimization algorithms, which are arranged to perform the functions as, described herein including those described with respect to the process of FIG. 3, which is discussed below. Program data 230 can include the battery optimization data, for example motion data, including rotational velocity and one or more forces experiences by mobile device 105, time period data, and the like, that can be useful for operation of the battery optimization algorithms, as is described herein. In implementations, applications 225 can be arranged to operate with program data 230 on operating system 220 such that implementations of the battery optimization may be provided as described herein. Applications 225 can be incorporated as a part or module in another programs, such as mobile apps and the OS, incorporated in hardware, provide services to other application etc.

In implementations, mobile device 105 can include one or more motion sensors 240 that can be operable to detect motion of mobile device 105. One or more motion sensors 240 can be operable to communicate with applications 225 and program data 230. Motion sensors 240 can include hardware, software, firmware, or combinations thereof. For example, motion sensors 240 can include a gyroscope sensor, an accelerometer sensor, or both.

In an example, the gyroscope sensor can be a micro-electro-mechanical system (MEMS) gyroscope. The gyroscope sensor can measure the rotational velocity of mobile device 105 along three primary axes of mobile device 105. When mobile device 105 is still, the readings from the gyroscope are zero for all axes. If mobile device 105 is rotated around its center point, like an airplane propeller, the rotational velocity on the Z axis will elevate above zero and grow larger as mobile device 105 is rotated faster. The rotational velocity can be measured in units of radians per second, where 2*Pi radians is a full rotation. The absolute orientation in space (yaw, pitch, and roll) of mobile device can also be determined, at least in part, using the gyroscope and one or more conventional motion tracking algorithms.

In implementations, the gyroscope can be used, at least in part, to determine whether the amount of motion experienced of mobile device 105 exceeds a predetermined motion threshold amount. The gyroscope can be used, at least in part, to measure a rotational velocity of mobile device 105 along three primary axes during the predetermined time period. A vector sum of the rotational velocity can then be computed. A value for the displacement of mobile device 105 can be determined, at least in part, based on the vector sum of the rotational velocity and the predetermined time period.

In other example, the accelerometer sensor can be a micro-electro-mechanical system (MEMS) accelerometer. The accelerometer can be operable to measure the forces applied to mobile device 105 at a moment in time. These forces can be used to determine in which direction mobile device 105 is moving. The acceleration value can be expressed as a 3-dimensional vector representing the acceleration components in the X, Y, and Z axes in gravitational units. The orientation of the acceleration is relative to mobile device 105 such that −1 g is applied in the Z-axis when the device is face up on a level table and −1 g is applied to the Y-axis when the device is placed perpendicular to the table top. The accelerometer sensor can be operable to detect the force of gravity along with any forces resulting from the movement of mobile device 105. The accelerometer can be combined with other sensors embodied as hardware, software, firmware, algorithms, or combinations thereof to determine motion of mobile device 105 to separate the gravity vector from the device acceleration to determine the current attitude (yaw, pitch, and roll) of the device.

In implementations, the accelerometer can be used, at least in part, to determine whether the amount of motion experienced of mobile device 105 exceeds a predetermined motion threshold amount. The accelerometer can be used, at least in part, to measure an applied force experienced by the mobile device while in motion along three primary axes during the predetermined time period. An acceleration value can then be computed as a three-dimensional vector acceleration having components in three principle axes. The acceleration value can then be used to determine an amount or movement or displacement based, at least in part, on the three-dimensional vector acceleration and the predetermined time period.

In implementations, mobile device 105 can use both the gyroscope sensor and the accelerometer sensor to determine movement and/or motion of mobile device 105. Additionally, other suitable conventional motion sensors, whether in hardware, software, and/or firmware, can also be used.

Device 105 can communicate directly with access point 110 through communication module 235 and transceivers 245. For example, device 105 can be operable to communicate using one or more wireless communication protocols. The wireless communication protocols can include near-field protocols, for example, but not limited to, Bluetooth, near-field communication (NFC), infrared and/or wide area protocols, for example, but not limited to, cellular, WiFi, WiMAX. Other suitable communication protocols can also be used.

In implementations, the battery optimization application 225 can cooperate with the with the communication module 235 and the one or more motion sensors 240 to determine that a wireless signal associated with access point 110 is at or below a reception strength threshold. Battery optimization application 225 can then disable the wireless network connection in response to the determination that the wireless signal being at or below the reception strength threshold. The one or more motion sensors 240 can be used to capture motion and/or movement experienced by mobile device 105 during a predetermined time period. If the amount of motion of the mobile device is determined to exceed a predetermined motion threshold, then mobile device 105 can be operable to try to acquire the wireless network connection or a new or different wireless network connection to access point 110 in response to the amount of motion exceeding the predetermined motion threshold. If the amount of motion is less than the predetermined motion threshold, battery optimization application 225 can be operable to initiate another time period in which motion data is acquired.

Figure 3:
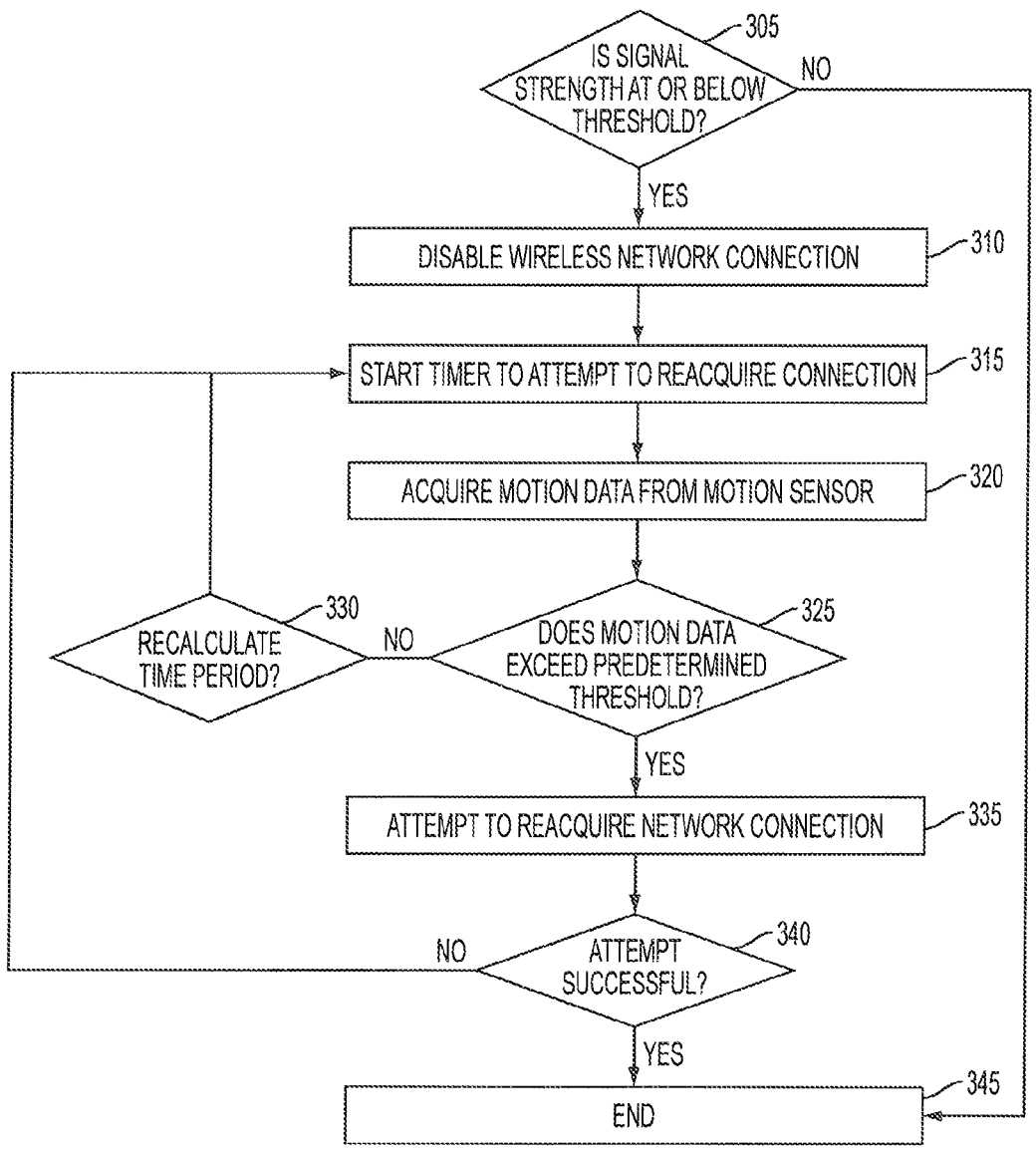
FIG. 3 is an example flowchart illustrating the battery optimization process according to implementations of the present disclosure.

FIG. 3 shows an example flow chart for the battery optimization protocol in accordance with implementation of the present disclosure. At 305, battery optimization engine and/or other logic, platforms, applications, and/or services can be invoked on the mobile device 105. Battery optimization can be invoked in response to a wireless network connection activation to make a determination as to whether the signal strength of the wireless mobile communication device to the access point is at or below a minimum signal strength threshold, whether the wireless network connectivity is intermittent, or both. For example, battery optimization engine can be initiated at any time when mobile device 105 is relying on the battery for the power source. Additionally or alternatively, battery optimization can be invoked once the battery level reaches a predetermined minimum battery threshold level, such as, when the battery has less than 50% operating time remaining. Other predetermined battery threshold levels can be used, for example, less than 25% or 10%. The predetermined battery threshold level can be user-defined or device-defined.

In implementations, battery optimization can be invoked when the wireless network signal strength reaches a predetermined minimum signal strength level. The battery optimization engine and/or other logic, platforms, applications, and/or services can also be invoked when the wireless network connectivity becomes intermittent such that mobile device 105 continuously acquires and loses wireless network connectivity. The battery optimization engine can also be invoked when the wireless network signal strength reaches a predetermined minimum signal strength level and when wireless network connectivity becomes intermittent.

If the determination at 305 is positive, meaning that the signal strength is below the minimum signal strength threshold, the wireless network connectivity is intermittent, or both, battery optimization can disable the wireless network connection between the wireless mobile communication device and the access point at 310. For example, when mobile device 105 is in area "C," battery optimization can disable wireless communication connectivity by, for example, sending a deactivation signal to communication mobile 235 and/or transceiver 245. Since the process of activating communication module 235 and transceiver 245 of mobile device 105 is an unnecessary power consumer when in locations of poor or intermittent wireless network connectivity, deactivation of the wireless network connection by placing communication module 235 and/or transceiver 245 in an idle or power-saving mode can increase battery life of mobile device 105.

At 315, once the wireless network connection is disabled, battery optimization can invoke a timer that can be used to determine a time in which to attempt to reacquire the wireless network connection. The time period with which the wireless mobile communication device attempts to reacquire the wireless network connection can be specified by the device or by the user.

At 320, once the timer has started, battery optimization engine can acquire motion data from one or more motion sensors 250. In implementations, once the timer has started, one or more motion sensors 240, for example, gyroscope, accelerometer, or both, can be invoked to capture motion data experienced by mobile device 105. One or more timing algorithms can be invoked to determine the start and end times for the timer. For example, the one or more timing algorithms can be operable to create successive time periods or intervals with equal time length, where a first time period or interval can be a predetermined number of time units (seconds or minutes) and each successive time period or interval is equal to the first. Alternatively, the one or more timing algorithms can be operable to create successive time periods or intervals with unequal time length. For example, the one or more timing algorithms can include an exponential backoff algorithm, where each successive time period or interval is greater than the preceding time period or interval. Other suitable conventional timing algorithms can also be used.

In implementations, motion data from one or more motion sensors 240 can be acquired during the timer periods or intervals. Motion data from successive time periods or intervals can be compared and/or combined to determine an amount of movement experienced by mobile device 105.

At 325, battery optimization can be operable to make a determination as to whether the wireless mobile communication device has moved more than a predetermined distance threshold. Since mobile device 105 is unlikely to experience in wireless network connectivity while at or near the location where the wireless network connection was previously disabled, the process of trying to reacquire the wireless network connection tends to only serve to further drain the battery, thus decreasing the battery life of mobile device 105. FIG. 4 shows an example of this condition where mobile device 105 has moved to position "X," which is near its original position. By waiting until mobile device 105 is in a new or different location, as determined by the accumulated motion data detected by the one or more motion sensors 250, the chances of being in a location of better wireless network connectivity can be improved. FIG. 4 shows an example of this condition where mobile device 105 has moved to position "Y," which in this case is closer to access point 110. The predetermined distance threshold can be defined by the user and/or can be preset in mobile device 105.

In implementations where the one or more motion sensors 240 includes the gyroscope, the gyroscope can be used, at least in part, to determine whether the amount of motion experienced of mobile device 105 exceeds a predetermined motion threshold amount. The gyroscope can be used, at least in part, to measure a rotational velocity of mobile device 105 along three primary axes during the predetermined time period. A vector sum of the rotational velocity can then be computed. A value for the displacement of mobile device 105 can be determined, at least in part, based on the vector sum of the rotational velocity and the predetermined time period.

In implementations where the one or more motion sensors includes the accelerometer, the accelerometer can be used, at least in part, to determine whether the amount of motion experienced of mobile device 105 exceeds a predetermined motion threshold amount. The accelerometer can be used, at least in part, to measure an applied force experienced by the mobile device while in motion along three primary axes during the predetermined time period. An acceleration value can then be computed as a three-dimensional vector acceleration having components in three principle axes. The acceleration value can then be used to determine an amount or movement or displacement based, at least in part, on the three-dimensional vector acceleration and the predetermined time period.

In implementations, the one or more motion sensors can include both the gyroscope and accelerometer where both can be used to determine the movement of mobile device 105.

If the determination at 325 is positive, meaning that the wireless communication device has moved a predetermined minimum distance threshold, battery optimization can invoke communication module 235 and transceiver 245 to attempt to reacquire the wireless network connection or acquire a new wireless network connection at 335. If the attempt is successful at 340, then the process can end at 345.

If the result of the determination at 325 is negative, meaning that mobile device 105 has not moved the predetermined minimum threshold, or the attempt is unsuccessful at 325, then a determination can be made at 330 as to whether a different time period should be calculated. For example, the different time period can be based on the exponential backoff algorithm, discussed above. The exponential backoff algorithm can be based on the relative motion, such that if mobile device 105 has not moved or has moved a little (indicating a substantially stationary position) during successive time periods, battery optimization can use the exponential algorithm. Conversely, if the one more motion sensors 240 detected more motion, but not enough to get over the threshold, then a different timing algorithm may be used. The result of the determination at 330 at to which timing algorithm is to be used can then be supplied at 315 where the mobile device 105 starts the timer or a new timer again.

The present disclosure is not to be limited in terms of the particular implementations described in this application, which are intended as illustrations of various implementations. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims.

What is claimed is:

1. A method for optimizing battery life in a mobile computing device, the method comprising:
    determining that a wireless signal associated with a wireless network connection utilized by the mobile computing device is at or below a reception strength threshold;
    in response to determining that a wireless signal associated with a wireless network connection utilized by the mobile computing device is at or below a reception strength threshold, disabling the wireless network connection in response to the wireless signal being at or below the reception strength threshold;
    while the wireless network connection is disabled:
        determining, from one or more motion sensors of the mobile computing device, an amount of motion of the mobile computing device during a predetermined time period;
        determining that the amount of motion of the mobile device exceeds a predetermined motion threshold; and
        in response to determining that the amount of motion of the mobile device exceeds a predetermined motion threshold, enabling the previously-disabled wireless network connection.

2. The method of claim 1, the method further comprising:
    determining a new time period in response to the amount of motion not exceeding the predetermined motion threshold;
    acquiring, from the one or more motion sensors of the mobile computing device, a new amount of motion of the mobile computing device during a new time period;
    determining whether the new amount of motion of the mobile device exceeds a predetermined motion threshold; and
    enabling the wireless network connection in response to the new amount of motion exceeding the predetermined motion threshold.

3. The method of claim 2, wherein the new time period is determined based on an exponential back-off algorithm.

4. The method according to claim 1, wherein the one or more motion sensors comprises an internal motion sensor selected from the group consisting of: a gyroscope and an accelerometer.

5. The method of claim 4, wherein determining, by the gyroscope, whether the amount of motion of the mobile device exceeds a predetermined motion threshold comprises:
    measuring a rotational velocity of the mobile device along three primary axes during the predetermined time period;
    computing a vector sum of the rotational velocity; and
    determining displacement based on the vector sum of the rotational velocity and the predetermined time period.

6. The method of claim 4, wherein determining, by the accelerometer, whether the amount of motion of the mobile device exceeds a predetermined motion threshold comprises:
    measuring an applied force experienced by the mobile device while in motion along three primary axes during the predetermined time period;
    computing an acceleration value as a three-dimensional vector acceleration having components in three principle axes; and
    determining displacement based on the three-dimensional vector acceleration and the predetermined time period.

7. The method according to claim 1, further comprising:
    determining, prior to disabling the wireless network connection, a battery level of the mobile computing device; and
    disabling the wireless network connection if the battery level is at or below a minimum battery level.

8. A device comprising:
one or more processors; and
a computer readable medium comprising instructions that when executed by the one or more processors, cause the device to perform a method comprising:
    determining that a wireless signal associated with a wireless network connection utilized by the mobile computing device is at or below a reception strength threshold;
    in response to determining that a wireless signal associated with a wireless network connection utilized by the mobile computing device is at or below a reception strength threshold, disabling the wireless network connection in response to the wireless signal being at or below the reception strength threshold;
    while the wireless network connection is disabled:
        determining, from one or more motion sensors of the mobile computing device, an amount of motion of the mobile computing device during a predetermined time period;
        determining that the amount of motion of the mobile device exceeds a predetermined motion threshold; and
        in response to determining that the amount of motion of the mobile device exceeds a predetermined motion threshold, enabling the previously-disabled wireless network connection.

9. The device of claim 8, the device further comprising:
    determining a new time period in response to the amount of motion not exceeding the predetermined motion threshold;
    acquiring, from the one or more motion sensors of the mobile computing device, a new amount of motion of the mobile computing device during a new time period;
    determining whether the new amount of motion of the mobile device exceeds a predetermined motion threshold; and
    enabling the wireless network connection in response to the new amount of motion exceeding the predetermined motion threshold.

10. The device of claim 9, wherein the new time period is determined based on an exponential back-off algorithm.

11. The device according to claim 8, wherein the one or more motion sensors comprises an internal motion sensor selected from the group consisting of: a gyroscope and an accelerometer.

12. The device of claim 11, wherein determining, by the gyroscope, whether the amount of motion of the mobile device exceeds a predetermined motion threshold comprises:
  measuring a rotational velocity of the mobile device along three primary axes during the predetermined time period;
  computing a vector sum of the rotational velocity; and
  determining displacement based on the vector sum of the rotational velocity and the predetermined time period.

13. The device of claim 11, wherein determining, by the accelerometer, whether the amount of motion of the mobile device exceeds a predetermined motion threshold comprises:
  measuring an applied force experienced by the mobile device while in motion along three primary axes during the predetermined time period;
  computing an acceleration value as a three-dimensional vector acceleration having components in three principle axes; and
  determining displacement based on the three-dimensional vector acceleration and the predetermined time period.

14. The device according to claim 8, further comprising:
  determining, prior to disabling the wireless network connection, a battery level of the mobile computing device; and
  disabling the wireless network connection if the battery level is at or below a minimum battery level.

15. A non-transitory computer readable medium comprising instructions that when executed by the one or more processors, cause the device to perform a method comprising:
  determining that a wireless signal associated with a wireless network connection utilized by the mobile computing device is at or below a reception strength threshold;
  in response to determining that a wireless signal associated with a wireless network connection utilized by the mobile computing device is at or below a reception strength threshold, disabling the wireless network connection in response to the wireless signal being at or below the reception strength threshold;
  while the wireless network connection is disabled:
    determining, from one or more motion sensors of the mobile computing device, an amount of motion of the mobile computing device during a predetermined time period;
    determining that the amount of motion of the mobile device exceeds a predetermined motion threshold; and
    in response to determining that the amount of motion of the mobile device exceeds a predetermined motion threshold, enabling the previously-disabled wireless network connection.

16. The non-transitory computer readable storage medium of claim 15, the device further comprising:
  determining a new time period in response to the amount of motion not exceeding the predetermined motion threshold;
  acquiring, from the one or more motion sensors of the mobile computing device, a new amount of motion of the mobile computing device during a new time period;
  determining whether the new amount of motion of the mobile device exceeds a predetermined motion threshold; and
  enabling the wireless network connection in response to the new amount of motion exceeding the predetermined motion threshold.

17. The non-transitory computer readable storage medium of claim 16, wherein the new time period is determined based on an exponential back-off algorithm.

18. The non-transitory computer readable storage medium according to claim 15, wherein the one or more motion sensors comprises an internal motion sensor selected from the group consisting of: a gyroscope and an accelerometer.

19. The non-transitory computer readable storage medium of claim 18, wherein determining, by the gyroscope, whether the amount of motion of the mobile device exceeds a predetermined motion threshold comprises:
  measuring a rotational velocity of the mobile device along three primary axes during the predetermined time period;
  computing a vector sum of the rotational velocity; and
  determining displacement based on the vector sum of the rotational velocity and the predetermined time period.

20. The non-transitory computer readable storage medium of claim 18, wherein determining, by the accelerometer, whether the amount of motion of the mobile device exceeds a predetermined motion threshold comprises:
  measuring an applied force experienced by the mobile device while in motion along three primary axes during the predetermined time period;
  computing an acceleration value as a three-dimensional vector acceleration having components in three principle axes; and
  determining displacement based on the three-dimensional vector acceleration and the predetermined time period.

* * * * *